United States Patent [19]
Torii

[11] Patent Number: 5,444,863
[45] Date of Patent: Aug. 22, 1995

[54] RADIO COMMUNICATION APPARATUS HAVING COMMON CIRCUITS USABLE BY TRANSMITTER AND RECEIVER SYSTEMS

[75] Inventor: Kenichi Torii, Fujisawa, Japan

[73] Assignee: Kabushiki Kaisha Toshiba, Kawasaki, Japan

[21] Appl. No.: 969,058

[22] Filed: Oct. 30, 1992

[30] Foreign Application Priority Data

Oct. 31, 1991 [JP] Japan ................................. 3-286837

[51] Int. Cl.⁶ .............................................. H04B 1/44
[52] U.S. Cl. ...................................... 455/83; 455/84
[58] Field of Search ................ 455/73, 74, 78, 82, 455/83, 84, 61

[56] References Cited

U.S. PATENT DOCUMENTS 3,860,870  1/1975  Furuya .................. 455/61

FOREIGN PATENT DOCUMENTS 69939     4/1982  Japan .................. 455/78
3-283924  3/1990  Japan .
3-99549   4/1991  Japan .

*Primary Examiner*—Edward F. Urban
*Assistant Examiner*—Chi H. Pham
*Attorney, Agent, or Firm*—Banner & Allegretti, Ltd.

[57] ABSTRACT

There is provided a radio communication apparatus wherein a band-pass filter and a variable attenuator of a radio high-frequency circuit are designed such that these can be commonly used by transmitter and receiver systems. In a base-band circuit system, analog low-pass filters for smoothing a base-band signal and roll-off filters for removing unnecessary frequency components by digital filtering processing are designed such that these can be commonly used by the transmitter system and receiver system. In the demodulation system adopted in the orthogonal circuit system, orthogonal detection is followed by delay detection, and multipliers for orthogonal modulation are also used as multipliers for orthogonal demodulation. Further, for common use of the circuit elements by the transmitter system and receiver system, switches for connecting the signal line to the transmitter system or the receiver system in the transmission/reception mode are provided at one end or both ends of each of these circuits.

22 Claims, 7 Drawing Sheets

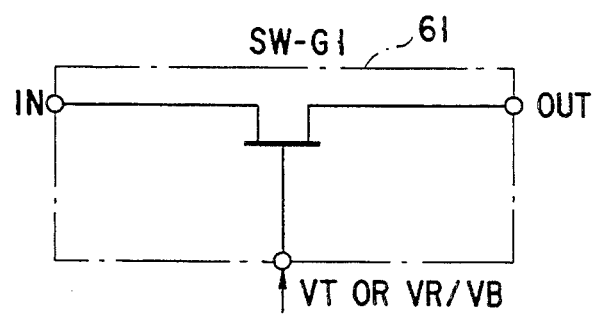
F I G. 2
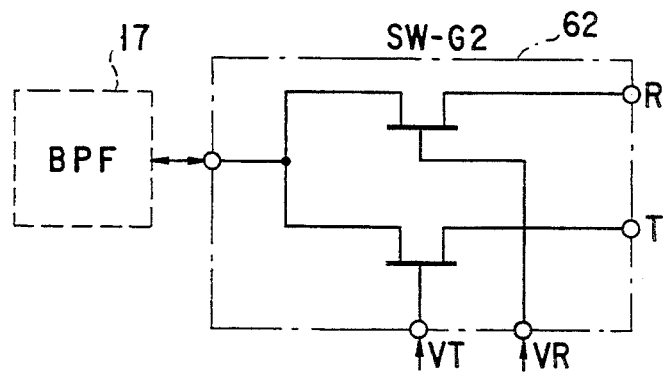
F I G. 3
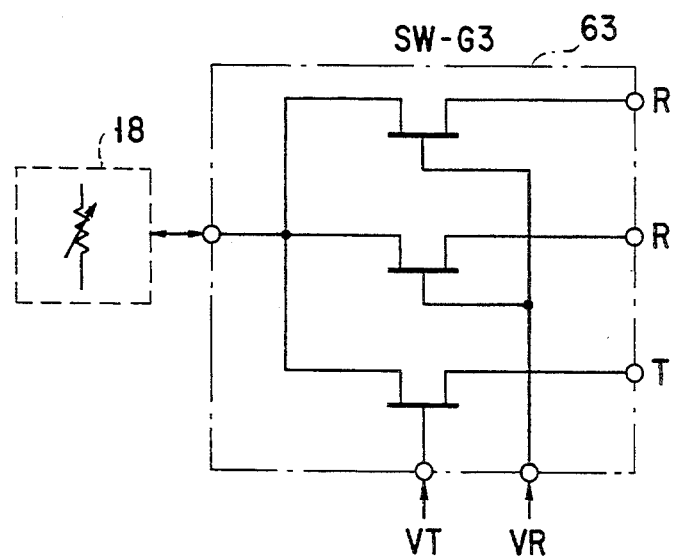
F I G. 4

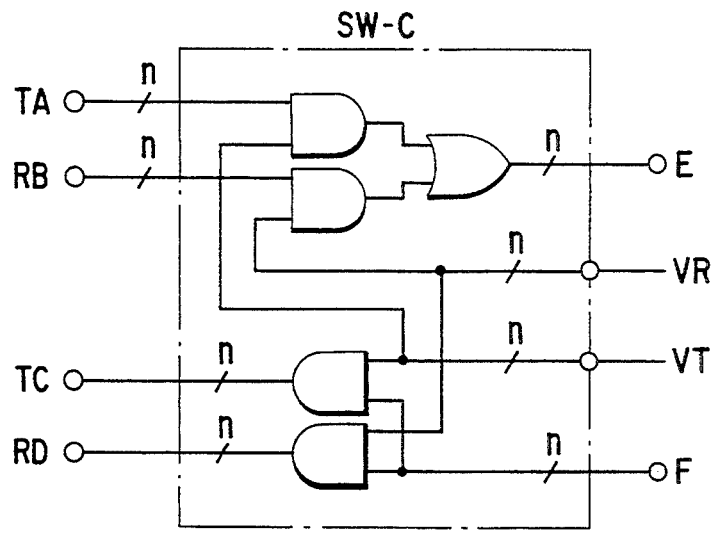
F I G. 7
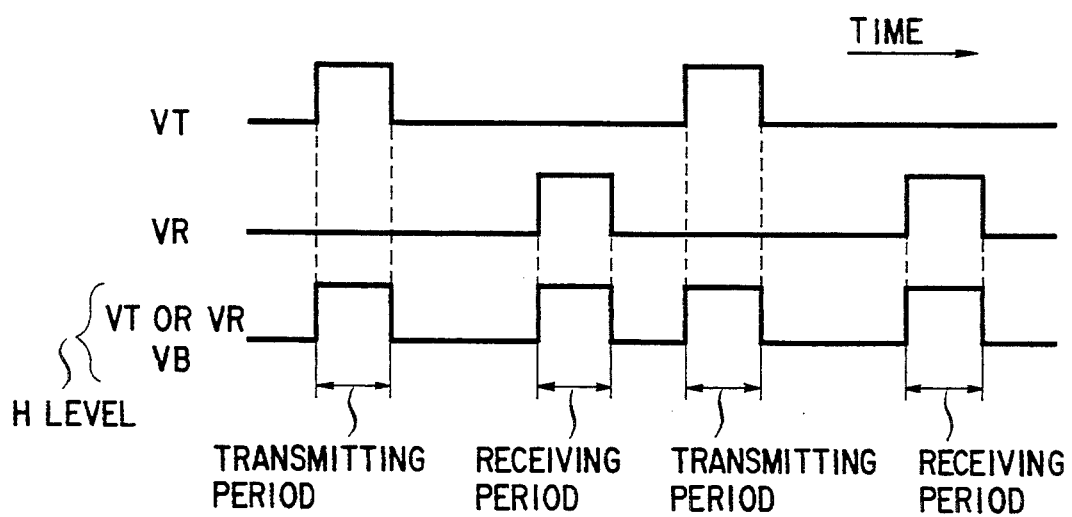
F I G. 8

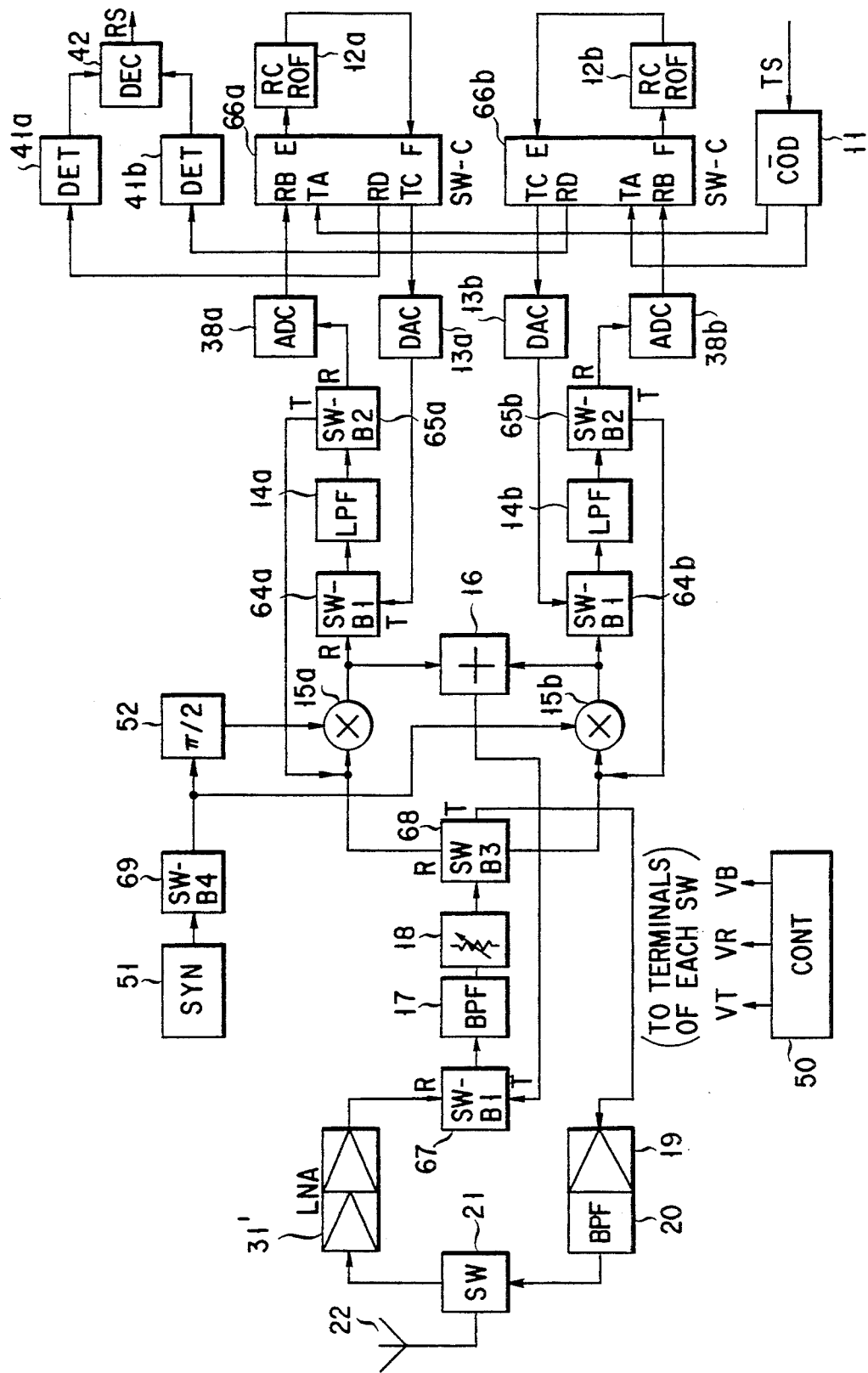
F I G. 9

RADIO COMMUNICATION APPARATUS HAVING COMMON CIRCUITS USABLE BY TRANSMITTER AND RECEIVER SYSTEMS

BACKGROUND OF THE INVENTION

1. Field of the Invention

The present invention relates to a radio communication apparatus for use in a base station or a mobile station in a mobile radio communication system of automobile phones, portable phones or cordless phones.

2. Description of the Related Art

FIG. 12 is a block diagram showing the circuit configuration of a conventional radio telephone apparatus. Specifically, in a transmitter system, a digitized voice signal or data signal is input to an encoder (COD) 11. In the encoder 11 the digital signal is encoded and compressed, and, where necessary, it is provided with an additional signal, thereby generating orthogonal signals (i.e. an I signal and a Q signal) for digital modulation. The orthogonal signals are subjected to digital filtering in route cosine roll-off filters 12a' and 12b' and unnecessary high-frequency components are removed. The resultant signals are converted to analog signals in digital-to-analog converters (DAC) 13a and 13b. The analog orthogonal signals are smoothed by low-pass filters (LPF) 14a' and 14b' and then input to multipliers 15a' and 15b'. In the multipliers 15a' and 15b', the analog orthogonal signals and orthogonal carrier signals are mixed to produce modulated carrier signals. The orthogonal carrier signal are produced such that a carrier signal generated by a frequency synthesizer (SYN) 51 is passed through a switch (SWG) 60 and then divided into two components and one of the two components is shifted by $\pi/2$ by a $\pi/2$ phase shifter 52. The modulated carrier signals output from the multipliers 15a' and 15b' are summed by an adder 16. The sum signal is delivered to a transmission power amplifier 19 through a band-pass filter (BPF) 17' and a variable attenuator 18', and it is amplified to a predetermined level. Then, the amplified modulated carrier signal is transmitted from an antenna 22 through a band-pass filter (BPF) 20 and a high-frequency switch (SW) 21.

On the other hand, in a receiver system, a modulated carrier signal received by the antena 22 passes through the switch 21 and is amplified by a low-noise amplifier (LNA) 31. The amplified signal passes enters a multiplier 34 via a band-pass filter (BPF) 32 and a variable attenuator 33. In the multiplier, the input modulated carrier signal is mixed with a local oscillation signal, which was generated from a frequency synthesizer 51 and delivered from a switch 60, and is frequency-converted to an intermediate frequency signal. Thereafter, the intermediate frequency signal is amplified by an intermediate frequency amplifier 35 and input to a frequency detector 36. After the amplified intermediate frequency signal is detected by the frequency detector 36, it is smoothed by an integrating discharger 37. As a result, a received base-band signal is demodulated. The base-band signal is digitized by an analog-to-digital converter (ADC) 38, and an unnecessary frequency component thereof is removed by digital filtering in a route cosine roll-off filter (RCROF) 39. The resultant signal is input to a decoder (DEC) 40. In the decoder 40, the received digital base-band signal is decoded to produce a digital voice signal or a digital data signal.

In the field of portable radio telephones and cordless radio telephones, it is an important object to reduce the size and weight and enhance the portability. It is another object to reduce the power consumption and increase the life of batteries.

However, the conventional radio telephone generally comprises an independent transmitter system and an independent receiver system. Thus, the circuit configuration of the entire apparatus is large and complex. In the prior art, individual circuits have been integrated in LSIs to reduce the size of the apparatus, but the number of chips is large and there is a limit in miniaturization of the entire circuits. In addition, there are circuits, such as filters, which are difficult to integrate, and this also limits the reduction in size and weight. Furthermore, the number of circuits is high and power consumption is also high accordingly. Thus, it is difficult to reduce the power consumption of the entire apparatus.

SUMMARY OF THE INVENTION

It is one of the objects of the present invention is to provide a radio communication apparatus reduced the number of circuit. The second object of the present invention is to reduce the size and weight of the apparatus. The third object of the present invention is to reduce the power consumption so as to increase the life of batteries.

In order to achieve the above objects, the present invention has the following features. Circuits having similar functions and used separately by a transmitter system and a receiver system are integrated as much as possible and commonly used by the transmitter and receiver systems. For example, a radio communication apparatus adopting a TDD (Time Division Duplex) transmission system is a kind of communication apparatus operated by a time compression multiplex transmitting system. The present invention is based on the fact that signal transmission and signal reception are performed digitally and in a time-sharing manner.

According to this invention, there is provided a radio communication apparatus for transmitting and receiving digital signals in a time-sharing manner, wherein
  at least one of the following pairs of circuits and elements is commonly used and integrated:
  (1) low-pass filters for removing an unnecessary high-frequency component contained in a transmission base-band signal, and low-pass filters for removing an unnecessary high-frequency component contained in a reception base-band signal;
  (2) a modulation circuit for modulating a carrier wave by using a transmission base-band signal and, thereby, producing a transmission modulated carrier wave, and a demodulation circuit for demodulating the reception base-band signal from a reception modulated carrier wave; and
  (3) a processing circuit for subjecting the transmission modulated carrier wave to predetermined preprocessing for power amplification, and a processing circuit for subjecting the reception modulated carrier wave to a predetermined pre-processing and supplying the pre-processed reception modulated carrier wave to the demodulation circuit.

In addition, switch circuits are provided at both ends of the commonly used circuit. In accordance with the transmission mode and reception mode, the switch circuits are operated to connect the commonly used circuit selectively to the transmission system circuits of the transmitter system or to the reception system circuits of the receiver system.

(Operation)

According to the present invention, some or all of the circuits of the transmitter system and receiver system, which have the same functions, are integrated into a single circuit system. Thus, the number of circuits can be reduced in accordance with the integration of circuits. Even if the scale of each circuit is unchanged, the total scale of all circuits can be reduced. As a result, the size of the communication system can be decreased, and the power consumption of the entire circuits can be reduced in accordance with the reduction in the number of circuits. This increases the battery life and the time of continuous use. In addition, if the size of the battery is reduced, instead of increasing the time of continuous use, the size and weight of the apparatus can be further reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows a detailed circuit configuration of a first switch circuit of the apparatus of the embodiment;

FIG. 3 shows the circuit configuration of a second switch circuit of the apparatus of the embodiment;

FIG. 4 shows the circuit configuration of a third switch circuit of the apparatus of the embodiment;

FIG. 7 shows the circuit configuration of a sixth switch circuit of the apparatus of the embodiment;

FIG. 8 is a timing chart showing the timing of a control signal output from a control circuit of the apparatus of this embodiment;

FIG. 9 is a block diagram showing the circuit configuration of a radio communication apparatus according to a modification of the embodiment;

DETAILED DESCRIPTION OF THE PREFERRED EMBODIMENTS

Figure 1:
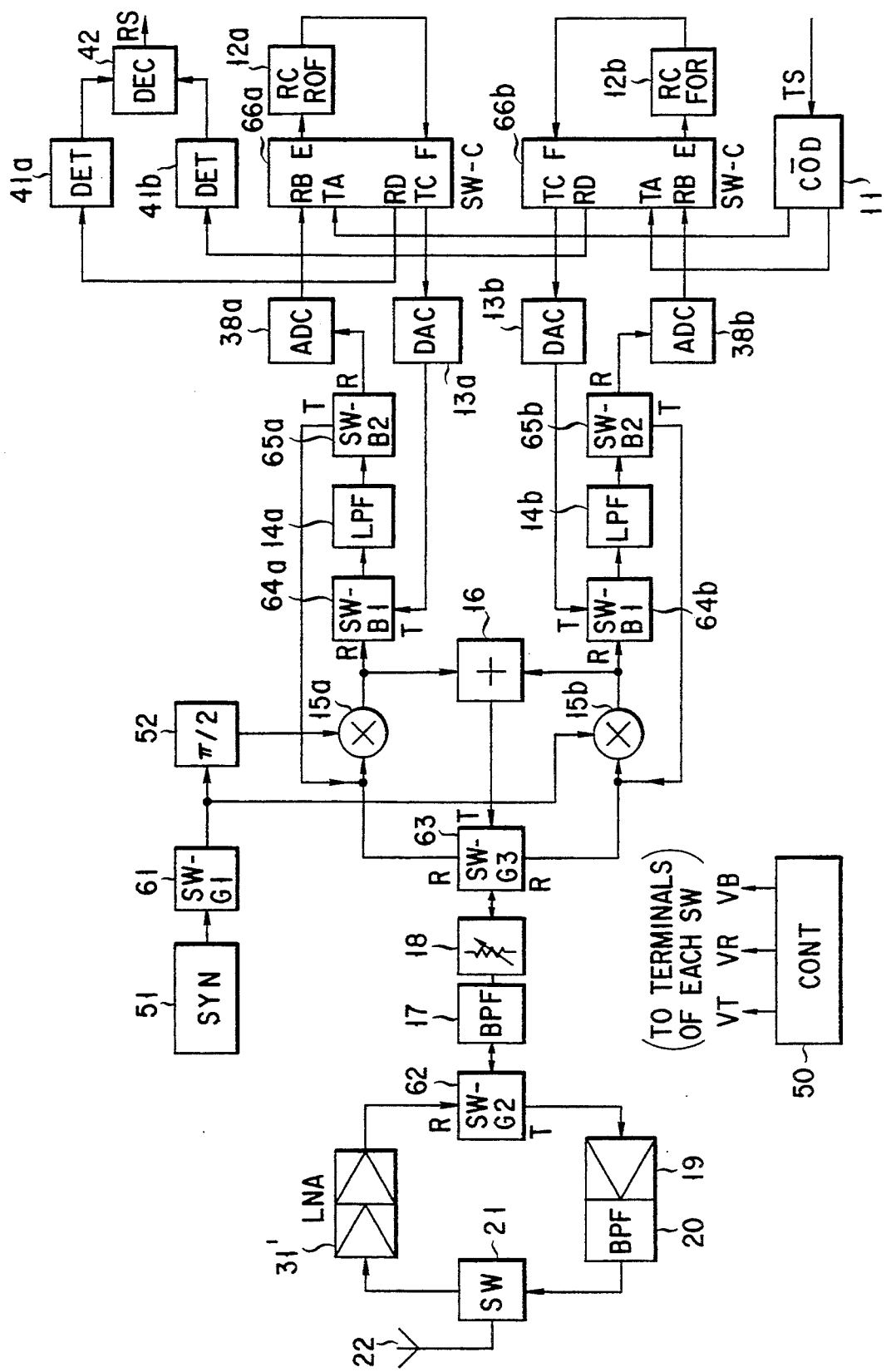
FIG. 1 is a block diagram showing the circuit configuration of a radio communication apparatus according to an embodiment of the present invention.
Figure 12:
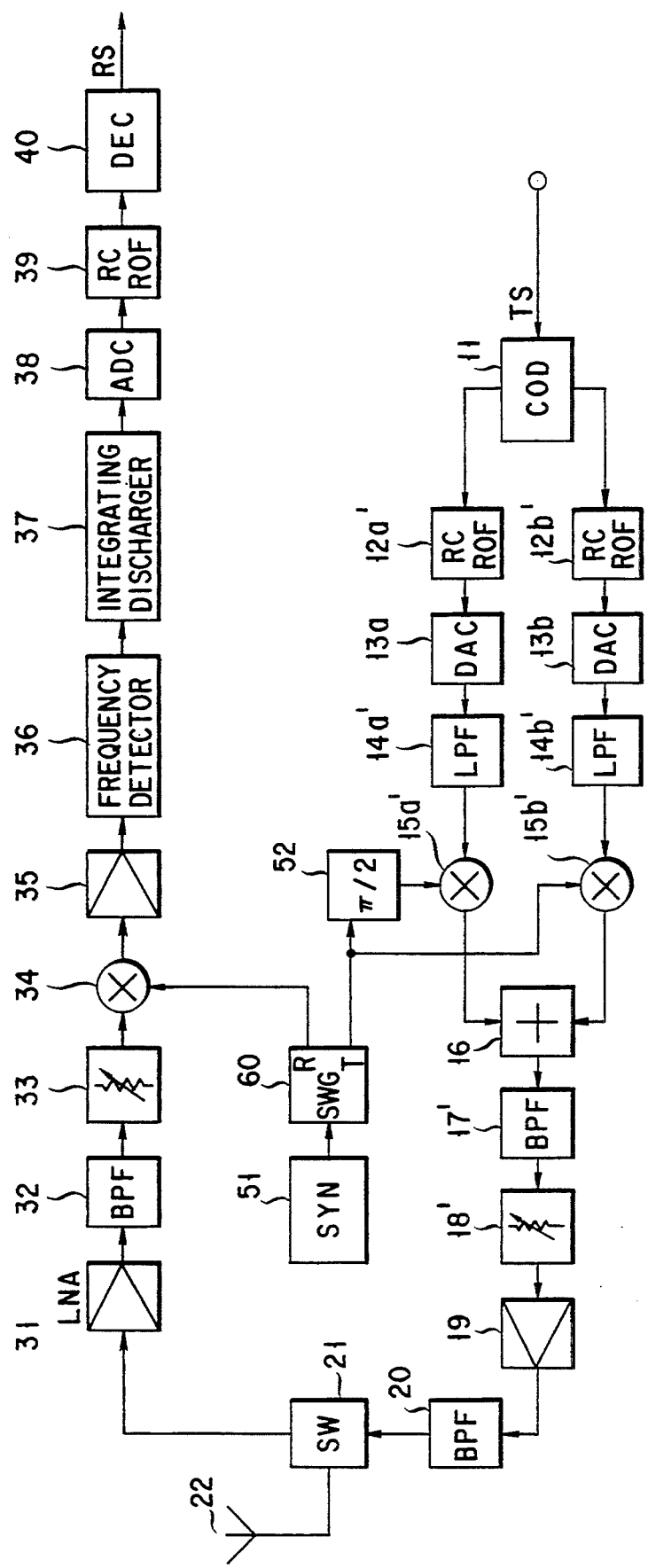
FIG. 12 is a block diagram showing the circuit configuration of a conventional radio communication apparatus.

FIG. 1 is a block diagram showing the circuit configuration of a radio communication apparatus according to an embodiment of the present invention. (The same parts as shown in FIG. 12 are denoted by like reference numerals, and a description thereof is omitted.)

In a radio high-frequency circuit system, a transmitter system and a receiver system commonly use a bandpass filter (BPF) 17 and a variable attenuator 18. A switch circuit (SW-G2) 62 is provided between the BPF 17, on the one hand, and a transmission power amplifier 19 and a low-noise amplifier 31′, on the other hand. The switch 62 connects the BPF 17 to the transmission power amplifier 19 in the transmission mode, and it connects the low-noise amplifier 31′ to the BPF 17 in the reception mode. The switch 62 comprises two galliumarsenic FETs (GaAsFET) as switching elements, as shown in FIG. 3. These FETs are set in the mutually reverse conduction states in accordance with switching control signals VT and VR supplied from a control circuit (CONT) 50. The low-noise amplifier 31′ has a multi-stage (two-stage) structure and, thereby, the received modulated carrier signal is amplified with a high gain and the signal level of the amplified signal is equalized to the signal level of the transmission modulated carrier signal. Specifically, the amplifier 31′ is constituted such that it can supply the received modulated carrier signal to the BPF 17 and variable attenuator 18 under substantially the same condition as that for the transmission modulated carrier signal.

In a modulation/demodulation circuit system, multipliers 15a and 15b are commonly used for orthogonal modulation and orthogonal demodulation. A switch circuit (SW-G3) 63 is provided between the variable attenuator 18, on the one hand, and the multipliers 15a and 15b, on the other hand. The switch 63 connects the multipliers 15a and 15b to the variable attenuator 18 in the reception mode, and it connects an adder 16 of the orthogonal modulator to the variable attenuator 18. For example, as shown in FIG. 4, the switch 63 comprises three GaAsFETs. The three FETs are selectively rendered conductive in accordance with switching control signals VT and VR delivered from the control circuit 50. Since the multipliers 15a and 15b are commonly used by the transmitter system and the receiver system, the output line of a frequency synthesizer 51 is provided with only a conduction switch (SW-G1) 61, and not a change-over switch. The conduction switch 61 is selectively rendered conductive only in the transmission period or reception period, thereby passing the output of the frequency synthesizer 51 through. For example, as shown in FIG. 2, the switch 61 comprises only one GaAsFET, as shown in FIG. 2, and it is turned on/off by a switching control signal VT or VR/VB generated by the control circuit 50.

Figure 5:
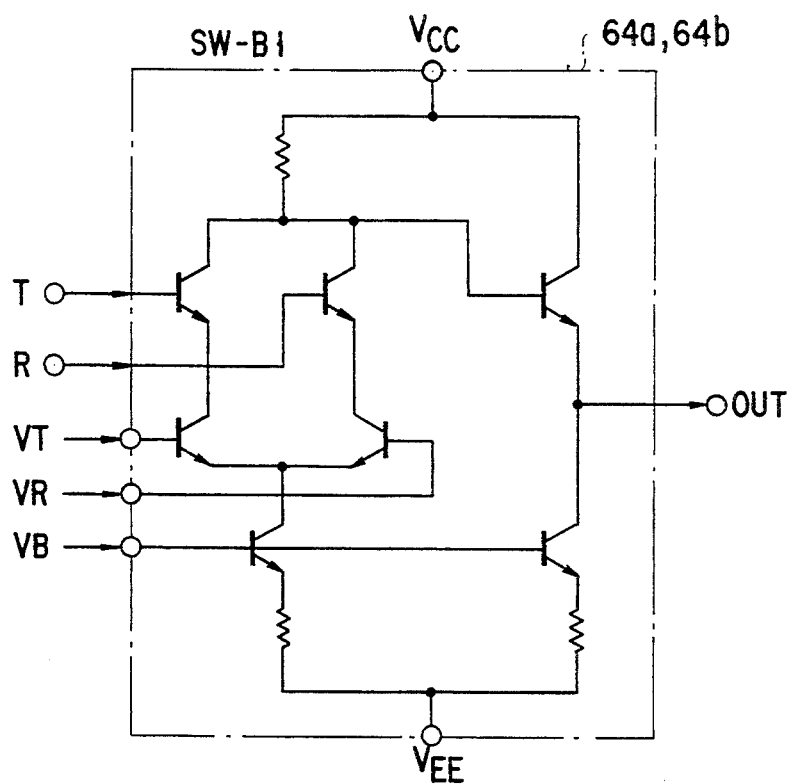
FIG. 5 shows the circuit configuration of a fourth switch circuit of the apparatus of the embodiment.
Figure 6:
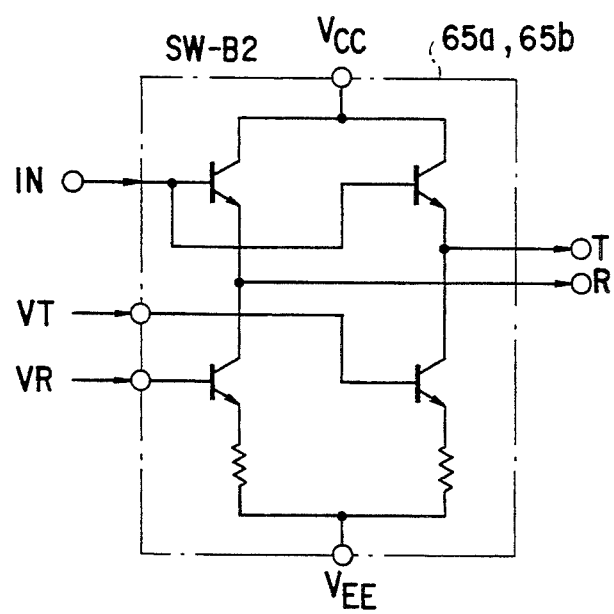
FIG. 6 shows the circuit configuration of a fifth switch circuit of the apparatus of the embodiment.

In an analog processing unit of the base-band circuit system, low-pass filters (LPF) 14a and 14b for smoothing a base-band signal are commonly used by the transmitter system and the receiver system. The LPF 14a and 14b are interposed between switch circuits (SW-B1) 64a, 64a and (SW-B2) 65a, 65b. The switch circuits 64a and 64b connect the multipliers 15a and 15b to the LPFs 14a and 14b in the reception mode. In the transmission mode, the switch circuits 64a and 64b connect DACs 13a and 13b, which convert transmission base-band signals to analog signals, to the LPFs 14a and 14b. For example, as shown in FIG. 5, the switch circuit 64a, 64b comprises bipolar transistors. On the other hand, the switch circuits 65a and 65b connect the LPFs 14a and 14b to ADCs 38a and 38b in the reception mode and also to the multipliers 15a and 15b in the transmission mode. The switch circuit 65a, 65b comprises bipolar transistors, for example, as shown in FIG. 6. Like the switch circuits 61, 62 and 63, these switch circuits 64a, 64b, 65a and 65b are operated by switching control signals VT, VR and VB output from the control circuit 50.

In a digital processing unit of the base-band circuit system, route cosine roll-off filters (RCROF) 12a and 12b are commonly used by the transmitter system and the receiver system. Switch circuits (SW-C) 66a and 66b are provided for common use of the RCROFs 12a and 12b. In the reception mode, the switch circuits 66a and 66b connect the ADCs 38a and 38b to the input terminals of the RCROFs 12a and 12b and also connect the output terminals of the RCROFs 12a and 12b to delay detectors (DET) 41a and 41b. In the transmission mode, the switch circuits 66a and 66b connect the encoder (COD) 11 to the input terminals of the RCROFs 12a and 12b and also connect the output terminals of the RCROFs 12 and 12b to DACs 13a and 13b. FIG. 7 shows an example of the structure of each switch circuit 66a, 66b. This comprises a combination of CMOS gates and is operated in accordance with switching control signals VT, VR and VB output from the control circuit 50.

The operation of the above apparatus will now be described.

In the transmission mode, for example, "H"-level switching control signals VT and VB, as shown in FIG. 8, are output from the control circuit 50. Thus, the switch circuits 66a and 66b are operated to permit conduction between terminals TA and E and between terminals F and TC. In each of the switch circuits 62, 63, 64a, 64b, 65a and 65b, a terminal T is selected. The switch circuit 61 is rendered conductive to pass the carrier signal generated from the frequency synthesizer (SYN) 51.

The orthogonal signals (I and Q signals) of the transmission digital signal output from the encoder 11 are input to the roll-off filters 12a and 12b via the switch circuits 66a and 66b. After unnecessary frequency components are removed by digital filtering processing, the resultant signals are input to the DACs 13a and 13b through the switch circuits 66a and 66b. The DACs 13a and 13b convert the orthogonal signals to analog signals. The analog signals are input to the LPFs 14a and 14b via the switch circuits 64a and 64b. In the LPFs 14a and 14b, the analog signals are smoothed. The smoothed signals are input to the multipliers 15a and 15b via the switch circuits 65a and 65b. In the multipliers 15a and 15b, the orthogonal signals are mixed with the orthogonal carrier signals generated by the frequency synthesizer 51 and $\pi/2$ phase shifter 52, thereby producing orthogonal modulated carrier signals. The modulated carrier signals are summed in the adder 16 and input to the variable attenuator 18 via the switch circuit 63. The level of the sum signal is controlled by the variable attenuator to produce a desired transmission output, the resultant signal is passed through the BPF 17. The modulated carrier signal output from the BPF 17 is input to the transmission power amplifier 19 via the switch circuit 62. The output amplified signal is passed through the BPF 20 once again and transmitted from the antenna 22 via the high-frequency switch 21.

The common components of the various circuits of the above apparatus function as the components of the transmitter system, thus enabling transmission of voice signals.

On the other hand, in the reception mode, "H"-level control signals VR and VB, as shown in FIG. 8, are output from the control circuit 50. Thus, an R terminal is selected in each of the switch circuits 62, 63, 64a, 64b, 65a and 65b. The switch circuits 66a and 66b are operated to permit conduction between terminals RB and E and between terminals F and RD.

When a modulated carrier signal is received by thee antenna 22, it is amplified to an adequately high level by the multi-stage low-noise amplifier 31' via the high-frequency switch 21. The amplified signal is input to the BPF 17 via the switch circuit 62. In the BPF 17, the band of the signal is limited in accordance with a radio channel frequency, and the level of the resultant signal is controlled by the variable attenuator 18 to have a predetermined signal level. Then, the resultant signal is input to the multipliers 15a and 15b via the switch circuit 63. In the multipliers 15a and 15b, the input signals are mixed with the orthogonal oscillation signals generated by the frequency synthesizer 51 and $\pi/2$ phase shifter 52, thereby producing received base-band signals. More specifically, orthogonal detection is performed by a direct conversion method.

The received base-band signals output from the multipliers 15a and 15b are input to the LPFs 14a and 14b via the switch circuits 64a and 64b. Unnecessary high frequency components are removed by the LPFs 14a and 14b, and the resultant signals are input to the ADCs 38a and 38b via the switch circuits 65a and 65b. After the received base-band signals are digitized by the ADCs 38a and 38b, these signals are input to the roll-off filters 12a and 12b via the switch circuits 66a and 66b. In the filters 12a and 12b, unnecessary frequency components are removed by digital filtering processing, and the resultant signals are input to the delay detectors 41a and 41b via the switch circuits 66a and 66b once again. In the delay detectors 41a and 41b, the digital base-band signals are delay-detected, and perfect digital signals are reproduced. Then, the digital signals are subjected to predetermined decoding processing in the decoder 42. As a result, the original digital voice signal or digital data is reproduced.

All the common components of the circuits of the above apparatus function as the components of the receiver system. By the switching operations, the modulated carrier signal, for example, is received.

In the above embodiment, the BPF 17 and variable attenuator 18 of the radio high-frequency circuit system can be commonly used by the transmitter and receiver systems. Regarding the base-band circuit system, the analog LPFs 14a and 14b for smoothing the base-band signals and the roll-off filters 12a and 12b for digital filtering processing can be commonly used by the transmitter and receiver systems. Furthermore, the receiving circuit system employs a demodulation system wherein orthogonal detection is followed by delay detection, and thereby the multipliers 15a and 15b for orthogonal demodulation is commonly used for orthogonal detection. Thereby, the number of circuits of multipliers can be reduced. Accordingly, in the present embodiment, the number of circuits of the radio communication apparatus can be remarkably reduced, compared to the conventional circuit configuration. In addition, since the number of filters can be reduced, which is difficult in general, the circuit scale of the entire apparatus can be reduced. As a result, the size and weight of the apparatus can further be reduced. Furthermore, since the number of roll-off filters and multipliers can be reduced, the power consumption of the entire circuit can be reduced and the life of attached batteries can be increased. This leads to longer continuous call time. Even if the battery capacity is reduced while the continuous call time is not increased and remains equal to that of the conventional apparatus, the size of the battery can be decreased. This decreases the size and weight of the apparatus.

In the above embodiment, if a "superheterodyne" type circuit is used as a frequency converter circuit, an LPF having a generally gentle "filtering characteristic" is used as its reception base-band circuit but LPFs 14a and 14b having a steep "filtering characteristic" are used as its transmission base-band circuit. Accordingly, if the LPF of the transmission base-band circuit and the LPF of the reception base-band circuit are commonly used simply, many drawbacks occur. Thus, in the present embodiment, since "double conversion method" is employed as a frequency conversion method, the reception base-band circuit needs to use an LPF having a steep "filtering characteristic" similar to the characteristic of the LPF of the transmission base-band circuit. As a result, the LPF of the reception base-band circuit and the LPF of the transmission base-band circuit can be commonly used with no problem.

Moreover, in the present embodiment, the low-noise amplifier 31' has a multi-stage (two-stage) structure, the signal level of the received modulated carrier signal can be sufficiently raised up to a level substantially equal to the signal level in the transmission circuit system. Thus, the difference between the effects of the reception system signal and transmission system signal due to the commonly used circuits can be decreased. In other words, circuits having general characteristics may be used as commonly used circuits, without considering the level difference between the reception system signal and transmission system signal.

(MODIFICATION)

The present invention is not limited to the above-described embodiment. For example, in the embodiment, the switch circuits 61, 62 and 63 comprising GaAsFETs are used in the high-frequency circuit system, but the switch circuits 61, 62 and 63 may be replaced by the circuits comprising bipolar transistors, as shown in FIG. 9. FIG. 9 shows a modification of the embodiment of the present invention. The transmission modulated carrier signal output from the adder 16 is input to the BPF 17 and variable attenuator 18 successively via a switch circuit (SW-B1) 67. Then, the output from the attenuator 18 is input to the transmission power amplifier 19 via a switch circuit (SW-B3) 68. The reception modulated carrier signal is input successively to the BPF 17 and variable attenuator 18 via the switch circuit 67 and then input to the multipliers 64a and 64b via the switch circuit 68, in a similar manner with the apparatus shown in FIG. 1.

Figure 10:
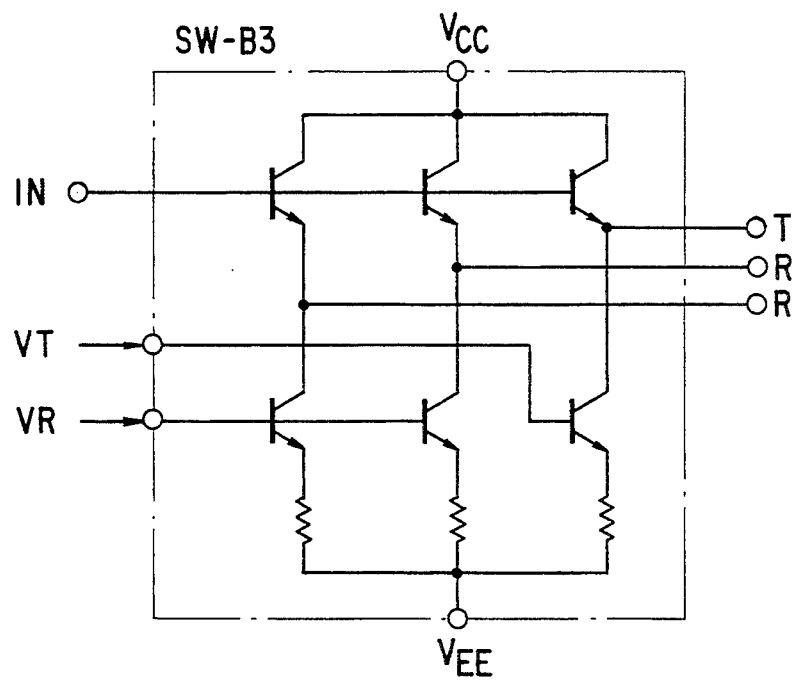
FIG. 10 shows the circuit configuration of a first switch circuit of this modification.
Figure 11:
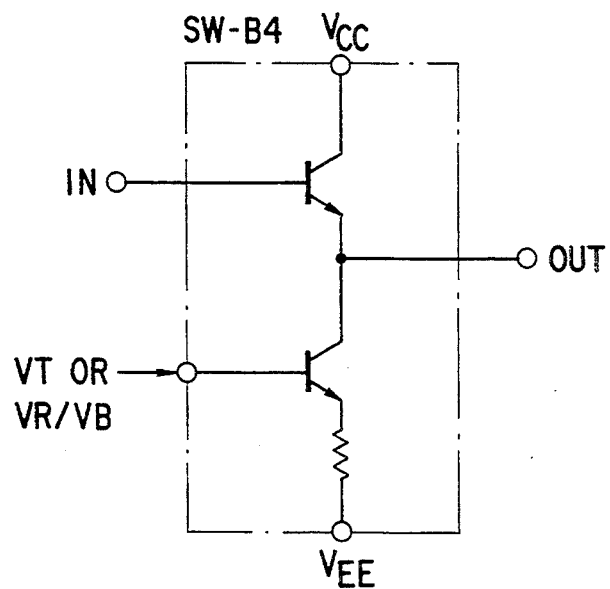
FIG. 11 shows the circuit configuration of a second switch circuit of the modification.

FIGS. 10 and 11 show examples of circuit configurations of the switch circuits 68 and 69. These switch circuits are operated by control signals VT, VR and VB output from the control circuit 50. The structure of the switch circuit 67 is identical to that of the above-described switch circuit 64a, 64b (FIG. 5).

In the embodiment (FIG. 1) and modification (FIG. 9), the "direct conversion method" was used. However, this invention is applicable to a circuit configuration in which the intermediate frequency is not zero and to a circuit using "double superheterodyne."

In the above embodiment, the transmission and reception radio frequencies are of the same TDD type. However, this invention is applicable to a radio communication apparatus adopting a system wherein the transmission and reception radio frequencies may differ (e.g. FDD (Frequency Division Duplex) or FDM (Frequency Division Multiplex)). In this case, a BPF is interposed between the transmission power amplifier 19 and switch circuit 62. Alternatively, another BPF is interposed between the low-noise amplifier 31' and switch circuit 67 and the BPF 17 between the switch circuit 67 and variable attenuator 18 is removed.

In the above embodiment and modification, the circuits from the radio high-frequency stage to the digital circuit of the demodulation base band are commonly used by the transmission and reception systems. However, only a part thereof may be commonly used on an as-needed basis.

Other modifications and changes may be made, without departing from the spirit of the invention, to the transmission system, modulation system, circuit configurations, switch circuit structures, communication systems to which the apparatus of this invention is applied, etc.

(Advantages)

As has been described above in detail, according to the radio communication apparatus of this invention, the number of circuits of the entire communication apparatus can be reduced, compared to the conventional apparatus. The circuits of the apparatus can be simplified and miniaturized, and power consumption is reduced. Accordingly, the size and weight of the entire apparatus can be reduced and the portability of the apparatus can be enhanced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A radio communication apparatus for use in a radio communication system wherein speech signals or data signals are transmitted over a radio link established between a base station and the radio communication apparatus, the radio communication apparatus comprising:

receiving means for receiving radio frequency signals transmitted over the radio communication link and for outputting first received signals;

first processing means for processing filtered information signals supplied thereto and for outputting first processed signals;

first filtering means for filtering the first received signals outputted from the receiving means and for outputting first filtered received signals when the radio communication apparatus performs a receiving operation, and for filtering the first processed signals outputted from the first processing means and for outputting first filtered processed signals when the radio communication apparatus performs a transmitting operation;

second processing means for processing the first filtered received signals outputted from the first filtering means and for outputting second processed signals;

transmitting means for transmitting over the radio link the first filtered processed signals outputted from the first filtering means; and second filtering means for filtering the second processed signals outputted by the second processing means when the radio communication apparatus performs the receiving operation, and for filtering information signals for transmission and for supplying the filtered information signals to the first processing means when the radio communication apparatus performs the transmitting operation.

2. The radio communication apparatus according to claim 1, wherein said first filtering means has an input and an output, further comprising first switching means for connecting said input of said first filtering means to said receiving means when the radio communication apparatus performs the receiving operation and for connecting said input of said first filtering means to said first processing means when the radio communication apparatus performs the transmitting operation.

3. The radio communication apparatus according to claim 2, further comprising second switching means for connecting said output of said first filtering means to said second processing means when the radio communication apparatus performs the receiving operation and for connecting said output of said first filtering means to said transmitting means when the radio communication apparatus performs the transmitting operation.

4. The radio communication apparatus according to claim 1, wherein said receiving means demodulates said radio frequency signals into base-band analog signals corresponding to the first received signals, and said first filtering means comprises a low-pass filter for filtering said base-band analog signals when the radio communication apparatus performs the receiving operation.

5. The radio communication apparatus according to claim 1, wherein said first processing means comprises an encoder for encoding signals supplied thereto and for outputting digital encoded signals corresponding to said information signals for transmission to said second filtering means and a digital to analog converter for converting said filtered information signals from said second filtering means to analog signals corresponding to said first processed signals, and said first filtering means comprises a low-pass filter for filtering said analog signals when the radio communication apparatus performs the transmitting operation.

6. The radio communication apparatus according to claim 1, wherein said second processing means comprises an analog to digital converter for converting said first filtered received signals outputted from said first filtering means into digital signals corresponding to said second processed signals, said second filtering means comprises a digital filter for filtering the digital signals outputted from said analog to digital converter when the radio communication apparatus performs the receiving operation, and said second processing means further comprises a decoder for decoding the filtered digital signals outputted from said digital filter and for outputting said decoded signals.

7. The radio communication apparatus according to claim 1, wherein said first processing means comprises an encoder for encoding signals supplied thereto and for outputting digital encoded signals corresponding to said information signals for transmission, said second filtering means comprises a digital filter for filtering the digital encoded signals outputted from said encoder when the radio communication apparatus performs the transmitting operation, wherein said filtered digital encoded signals correspond to said filtered information signals, and said first processing means further comprises a digital to analog converter for converting the filtered digital encoded signals to analog signals corresponding to said first processed signals.

8. The radio communication apparatus according to claim 1, wherein the second filtering means is operated in digital form, the first processing means includes digital-to-analog converting means for converting the filtered information signals outputted from the second filtering means into analog signals to be filtered by the first filtering means, and the second processing means includes analog-to-digital converting means for converting the first filtered received signals from the first filtering means into digital signals to be filtered by the second filtering means.

9. A radio communication apparatus for use in a radio communication system wherein speech signals or data signals are transmitted over a radio link established between a base station and the radio communication apparatus, the radio communication apparatus comprising:

receiving means for receiving first radio frequency signals transmitted over the radio link and for outputting first received signals;

first processing means for processing signals supplied thereto and for outputting first processed signals;

modulating and demodulating means for demodulating the first received signals outputted from the receiving means into baseband signals when the radio communication apparatus performs a receiving operation and for modulating the first processed signals outputted from the first processing means into second radio frequency signals when the radio communication apparatus performs a transmitting operation, said modulating and demodulating means comprising first and second multiplying means, signal addition means, and first and second low pass filters, said first multiplying means having a first input and a first output, said second multiplying means having a second input and a second output, said signal addition means having a third input connected to said first and second outputs and a third output, said first low pass filter having a fourth input and a fourth output, said second low pass filter having a fifth input and a fifth output;

second processing means for processing the baseband signals outputted from the modulating and demodulating means and for outputting second processed signals;

transmitting means for transmitting over the radio link the second radio frequency signals outputted from the modulating and demodulating means;

first switching means for connecting said first and second inputs to said receiving means when the radio communication apparatus performs the receiving operation, whereby said receiving means outputs said first received signals to said first and second inputs, and for connecting said third output to said transmitting means when the radio communication apparatus performs the transmitting operation, whereby said third output outputs said second radio frequency signals to said transmitting means;

second switching means for connecting said first and second outputs to said fourth and fifth inputs, respectively, when the radio communication apparatus performs the receiving operation and for connecting said fourth and fifth inputs to said first processing means when the radio communication apparatus performs the transmitting operation, whereby first processing means outputs said first processed signals to said fourth and fifth inputs; and third switching means for connecting said fourth and fifth outputs to said second processing means when the radio communication apparatus performs the receiving operation, whereby said fourth and fifth outputs output said base-band signals to said second processing means, and for connecting said fourth and fifth outputs to said first and second inputs, respectively, when the radio communication apparatus performs the transmitting operation.

10. The radio communication apparatus according to claim 9, wherein the first processing means comprises:

first analog-to-digital converting means for converting signals to be transmitted over the radio link into first digital signals;

encoding means for encoding the first digital signals outputted from the first analog-to-digital converting means; and first digital-to-analog converting means for converting the encoded first digital signals outputted from the encoding means into analog signals corresponding to said first processed signals, and wherein the second processing means comprises:

second analog-to-digital converting means for converting the baseband signals outputted from the modulating and demodulating means into second digital signals;

decoding means for decoding the second digital signals outputted from the second analog-to-digital converting means; and second digital-to-analog converting means for converting the decoded second digital signals outputted from the decoding means into said second processed signals.

11. The radio communication apparatus according to claim 9, wherein the modulating and demodulating means further comprises oscillating means for generating oscillating signals and for outputting the oscillating signals to said first and second multiplying means.

12. The radio communication apparatus of claim 9, wherein the modulation method of the modulating and demodulating means is an orthogonal modulation method.

13. The radio communication apparatus of claim 9, wherein the demodulation method of the modulating and demodulating means is an orthogonal demodulation method.

14. A radio communication apparatus for use in a radio communication system wherein speech signals or data signals are transmitted over a radio link established between a base station and the radio communication apparatus, the radio communication apparatus comprising:

control means for generating at least one control signal for controlling said radio communication apparatus to operate in one of a transmit mode and a receive mode;

a low noise receiver amplifier for receiving a first radio frequency signal transmitted over the radio link;

modulating means for modulating signals to be transmitted over the radio link into a second radio frequency signal;

adjusting means for adjusting a level of the first and second radio frequency signals;

demodulating means for demodulating an adjusted first radio frequency signal received from said adjusting means into analog signals of a certain frequency;

a transmission power amplifier for amplifying an adjusted second radio frequency signal received from said adjusting means;

first switching means for switchably connecting one of said receiver amplifier and said modulating means to an input of said adjusting means according to said control signal of said control means; and second switching means for switchably connecting one of said transmission power amplifier and said demodulating means to an output of said adjusting means according to said control signal of said control means.

15. A radio communication apparatus for transmitting and receiving speech signals or data signals over a radio link established with a base station, said radio communication apparatus comprising:

transmission/reception circuitry;

a transmit/receive switch, responsive to a transmit/-receive control signal, for selectively coupling said transmission/reception circuitry to an input terminal for transmit operations and to first and second output terminals for receive operations;

a first multiplication circuit having an input terminal coupled to the first output terminal of said transmit/receive switch and an output terminal;

a second multiplication circuit having an input terminal coupled to the second output terminal of said transmit/receive switch and an output terminal;

an adder circuit having first and second input terminals coupled to the output terminals of said first and second multiplication circuits, respectively, and an output terminal coupled to the input terminal of said transmit/receive switch;

first and second filter circuits, responsive to the transmit/receive control signals, having first input terminals coupled to the output terminals of said first and second multiplication circuits, respectively, and first output terminals for receive operations, and second input terminals and second output terminals, said second output terminals coupled to the input terminals of said first and second multiplication circuits, respectively, for transmit operations;

first processing circuitry for processing outbound speech or data signals to produce outbound baseband signals that are supplied to the second input terminals of said first and second filter circuits, wherein (1) said first and second filter circuits filter said outbound base-band signals to produce filtered outbound base-band signals at second output terminals thereof, (2) said first and second multiplication circuits receive the filtered outbound base-band signals at input terminals thereof and multiply the filtered outbound base-band signals with radio frequency signals to produce outbound radio frequency signals at the output terminals thereof, (3) said adder circuit receives the outbound radio frequency signals at the first and second input terminals thereof and adds the outbound radio frequency signals to produce a composite outbound radio frequency signal at the output terminal thereof, (4) said transmit/receive switch receives said composite outbound radio frequency signal at the input terminal thereof and supplies the composite outbound radio frequency signal to said transmission/- reception circuitry, and (5) said transmission/-reception circuitry transmits said composite outbound radio frequency signal over the radio link; and second processing circuitry having first and second input terminals coupled to the first output terminals of said first and second filter circuits, respectively, wherein (1) said transmission/reception circuitry receives an incoming radio frequency signal over the radio link and supplies the incoming radio frequency signal to said transmit/receive switch, (2) said transmit/receive switch supplies the incoming radio frequency signal to the first and second output terminals thereof, (3) said first and second multiplication circuits receive the incoming radio frequency signals at the input terminals thereof and multiply the incoming radio frequency signals with radio frequency signals to produce incoming base-band signals at output terminals thereof, (4) said first and second filter circuits receive the incoming base-band signals at the first input terminals thereof and filter the incoming base-band signals to produce filtered incoming base-band signals at first output terminals thereof, and (5) said second processing circuitry receives said filtered incoming base-band signals at the first and second input terminals thereof and processes the filtered incoming base-band signals to produce speech signals or data signals.

16. The radio communication apparatus according to claim 15, further comprising a controller for generating the transmit/receive control signal.

17. The radio communication apparatus according to claim 15, further comprising oscillator circuitry for generating radio frequency signals and for supplying the radio frequency signals to said first and second multiplication circuits, respectively.

18. The radio communication apparatus according to claim 17, wherein said oscillator circuitry generates first radio frequency signals and second radio frequency signals orthogonal to said first radio frequency signals, said first radio frequency signals being supplied to said first multiplication circuit and said second radio frequency signal being supplied to said second multiplication circuit.

19. The radio communication apparatus according to claim 15, wherein said first and second filter circuits comprise first and second low pass filter circuits, respectively.

20. The radio communication apparatus according to claim 19, wherein each of said first and second filter circuits further comprises switch circuits responsive to the transmit/receive control signal.

21. The radio communication apparatus according to claim 15, wherein said first processing circuitry comprises:
an encoder for encoding the outbound speech or data signals to produce digital signals;
digital filter circuitry for digitally filtering the digital signals to produce filtered digital signals; and
digital-to-analog converting circuitry for converting the filtered digital signals to produce the outbound base-band signals.

22. The radio communication apparatus according to claim 15, wherein said second processing circuitry comprises:
analog-to-digital converting circuitry for converting the filtered incoming base-band signals to produce digital signals;
digital filter circuitry for digitally filtering the digital signals to produce filtered digital signals; and
a decoder for decoding the filtered digital signals to produce the speech or data signals.

* * * * *